United States Patent
Repko et al.

(10) Patent No.: US 7,738,501 B2
(45) Date of Patent: Jun. 15, 2010

(54) METHOD OF RECOVERING TIMING OVER A GRANULAR PACKET NETWORK

(75) Inventors: Willem L. Repko, Hilversum (NL); Robertus Laurentius Van der Valk, Capelle a/d IJssel (NL)

(73) Assignee: Zarlink Semiconductor, Inc. (CA)

( * ) Notice: Subject to any disclaimer, the term of this patent is extended or adjusted under 35 U.S.C. 154(b) by 945 days.

(21) Appl. No.: 11/400,905

(22) Filed: Apr. 10, 2006

(65) Prior Publication Data

US 2006/0269029 A1  Nov. 30, 2006

(30) Foreign Application Priority Data

Apr. 15, 2005  (GB) ................................. 0507624.5

(51) Int. Cl.
*H04J 3/06*  (2006.01)
(52) U.S. Cl. .................... 370/503; 370/304; 375/354
(58) Field of Classification Search ................ 370/503, 370/510–514, 516, 518, 520, 401, 304; 375/354, 375/355, 356, 362
See application file for complete search history.

(56) References Cited

U.S. PATENT DOCUMENTS

| | | | | |
|---|---|---|---|---|
| 4,815,110 A | * | 3/1989 | Benson et al. | 375/356 |
| 6,816,510 B1 | * | 11/2004 | Banerjee | 370/503 |
| 7,356,036 B2 | * | 4/2008 | Van Der Valk et al. | 370/395.62 |
| 2004/0141526 A1 | * | 7/2004 | Balasubramanian et al. | 370/503 |
| 2004/0208268 A1 | * | 10/2004 | Yin Ying | 375/354 |
| 2005/0116834 A1 | * | 6/2005 | Block et al. | 340/825.21 |

FOREIGN PATENT DOCUMENTS

| | | |
|---|---|---|
| CN | 1383299 A | 12/2002 |
| EP | 0876017 A1 | 4/1998 |
| JP | 07-066814 A1 | 3/1995 |

* cited by examiner

*Primary Examiner*—Ricky Ngo
*Assistant Examiner*—Gary Mui
(74) *Attorney, Agent, or Firm*—Lawrence E. Laubscher, Jr.

(57) ABSTRACT

A method is disclosed for recovering timing information between master and slave nodes interconnected over a packet network having an underlying time grid with a distinct granularity. A series timing packets are exchanged between said master and slave nodes to measure the time offset of the time grid relative to clocks at the master and slave clocks. This offset is then used to either adjust the local clock at the slave node, or generate the clock using a digital controlled oscillator.

18 Claims, 3 Drawing Sheets

NETWORK
WITH TIME
GRANULAR
SWITCH/ROUTER

| --- Granularity interval ($g_m$, $g_s$)
↑ --- Packet arrival

*FIG. 6*
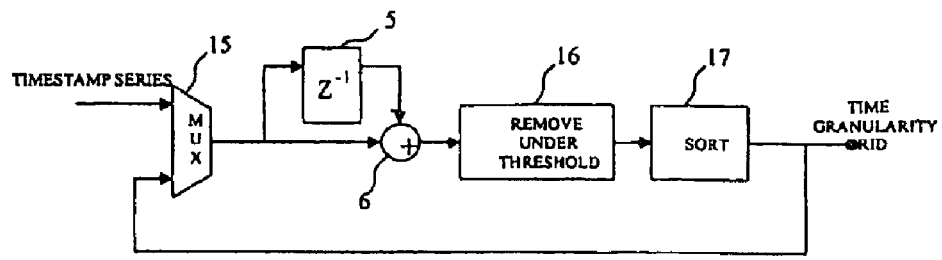
*FIG. 7*
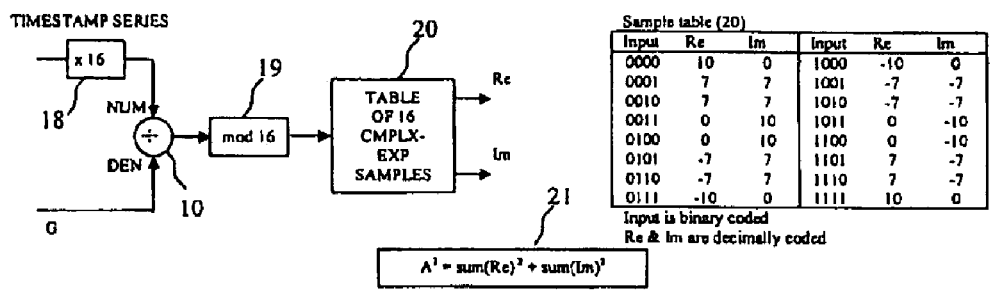
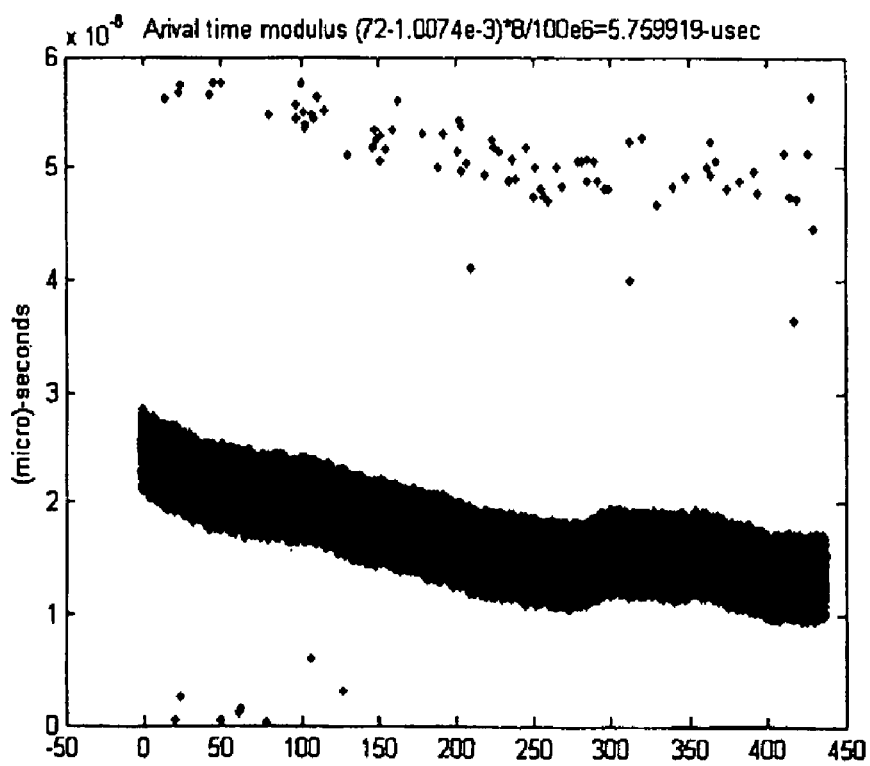
*FIG. 8*

METHOD OF RECOVERING TIMING OVER A GRANULAR PACKET NETWORK

FIELD OF THE INVENTION

This invention relates to the field of packet networks, and in particular to a method of recovering timing information over such networks.

BACKGROUND OF THE INVENTION

When time-sensitive data, such as voice or video data, is sent between a source node (Master) and destination node (Slave) over a packet network, the source and destination nodes will have local clocks that are not synchronized. Some method is needed for recovering the source clock at the destination node in order to recover the time-sensitive data.

Existing time distribution systems, such as Network Time Protocol (NTP), IEEE-1588, that use packet networks to synchronize clocks send so-called timing packets in both directions between the source and destination nodes. From these packets the transmission time is compared with the arrival time to enable the precise packet transit time to be determined. The clock frequency of the destination node is adjusted to retain a measured constant transit time for all timing packets passing through the network. In this way, the clock at the slaves can be synchronized to the clock at the master. This method is referred as 'Constant-Transit-Time' (CTT) clock distribution.

A CTT-method can combine the transit time for packets for both directions between source and destination node. On the assumption that both paths are subject to the same delay, the steady transit time can be eliminated so the slave clock runs with no offset relative to the Master node. The technique is referred to as 'Same-Time' synchronization.

Existing clock synchronization methods such as the Network Time Protocol (NTP) or Precision Time Protocol (PTP) from IEEE-1588, are based on the fact that packets travel with a Constant Transit Time (CTT-method) over the network. Such methods are sensitive to packet delay variations.

The CTT method loses precision when timing packets are queued at switching components and when the switching components show high timing granularity, which means that the packets are sent out at discrete time intervals. In Ethernet networks a granularity has been measured that relates to the duration required to send 3, 64 or 72 bytes over a 100 Mbps link. TDM based networks, such as T1 and E1, show a time granularity related to the frame rate of 8 kHz.

It is not possible to determine the transit time to a degree of precision better than the underlying timing granularity, and so the granularity of the network results in a loss of precision in the timing information exchanged between the source and destination nodes.

SUMMARY OF THE INVENTION

The present invention overcomes the loss of precision that occurs when a time granular switching component or a synchronous series of such components put a limit on the achievable precision.

According to the present invention there is provided a method of recovering timing information between master and slave nodes with respective master and slave clocks interconnected over a packet network having an underlying time grid with a distinct granularity, comprising exchanging a series timing packets between said master and slave nodes or sending timing packets from a network component to said master and slave nodes; measuring an offset of said time grid relative to the master and slave clocks; and using said offset to create a clock at the slave node matching said master clock.

In accordance with aspect of the invention a distributed system is used to synchronize the frequency of slave clocks to a master clock over a switched/routed packet network. The system sends packets in both directions between master and slave nodes connected to the packet network. The packets are time stamped upon arrival using the local clock of the node that receives the packet. The packet network contains a switch or router that forwards these packets at distinct multiples of an underlying time grid. The granular time grid is of the type seen in some of today's switching and routing components.

In one embodiment the granularity can be determined at the nodes receiving the packets by searching for a denominator value that provides a common remainder for a series of timestamps captured upon arrival. A frequency offset of the local slave clock creates an offset to both denominator values found at the master and the slave. The system uses the found offset to adjust the slave clock frequency or to generate a new clock from the slave clock using frequency synthesis techniques. The system can be used in combination with existing time synchronization techniques to improve the precision.

This invention uses the network time grid as a common reference and is referred to as 'Reference-Granularity' (RG) clock distribution. The RG-method can be used stand-alone providing a precise clock frequency distribution method or in combination with a CTT-method to provide Same-Time precision.

The measurement of time grid granularity is discussed, for example, in "Modifications of the Euclidean Algorithm for Isolating Periodicities from a Sparse Set of Noisy Measurements"-B. M. Sadler, S. D. Casey http://techreports.isr.umd.edu/reports/1995/TR 95-105. pdf) and "On Periodic Pulse Interval Analysis with Outliers and Missing Observations"-B. M. Sadler, S. D. Casey (http://techreports.isr.umd.edu/reports/1996/TR 96-6. pdf). These references show that only 10-100 timestamp samples taken in a short time are sufficient to determine the granularity present in the measurements. In the presence of noise more samples might be needed, although the performance degrades if there are too many samples.

The RG-based method of the invention is superior to the CTT-method when time granular components are part of the data path of the timing packets. A CTT-method would need many timing packets to average out the noise that is embedded in the transit time measures. Any averaging needs time to gain precision. The more precision that is required, the more samples that are needed and given a constant sample rate the more time that is needed. However there is a limit to the amount of time that can be spent on averaging to improve precision because the slave clock could start to drift in the meantime and thus introduce another source of imprecision.

Drift can also degrades the sensitivity of the RG-method. However experiments have shown that the precision improves much faster and achieves a precision better than 1 ppb ($10^{-9}$) using the packet arrival times of only 10-100 packets within an interval of not more than a few seconds and a timestamp measurement inaccuracy of more than 50 ns.

From a hardware design perspective the Modified Euclidean Algorithm approach from the above references can be implemented by someone experienced in the art without the need of a numerical division operator or a modulus operator. The data set needs consecutive iterations of differentiation and quick-sort. This can be mapped using some registers, a subtractor, a comparator, a memory unit and a simple controller. When available these iterations can also be mapped on a programmable processor.

This invention also applies to an embodiment wherein packets are sent from a third node to master and slave nodes under the condition that these packets pass through the same time-granular switching/routing reference component. The third node is not necessarily taking part of the synchronization between Master and Slave nodes as it does not need any information from these nodes. This invention also applies when the switching component itself sends time-granular packets to master and slave nodes. In both alternative cases these packets can be sent in unicast-, multicast- or broadcast-mode still under the condition that packets a send via one common time-granular reference component.

BRIEF DESCRIPTION OF THE DRAWINGS

The invention will now be described in more detail, by way of example only, with reference to the accompanying drawings, in which:

FIG. 6 is a block diagram showing apparatus, in accordance with one embodiment of the present invention, for determining a coarse guess of the time granularity grid present in a given set of noisy timestamps;

FIG. 7 is a block diagram showing apparatus, in accordance with one embodiment of the present invention, for implementing a simplified method to determine a complex exponential term; and FIG. 8 shows the result from real arrival time measures that were taken from packets traveling through a timing granular switching component.

DETAILED DESCRIPTION OF THE PREFERRED EMBODIMENTS

This invention describes a method for clock synchronization between master and slave nodes when packet delay variations are a cause of a time granular switching or routing component that schedule packets to their output on distinct multiples of an underlying time grid. The method described also applies when a series of such components are running at one common time grid such as in SDH and TDM networks.

A set of nodes is connected to a communication network. The network contains one switching/routing component that forwards these packets at distinct multiples of an underlying time grid. The network could also contain a series of these components that forward packets at a common time grid. Each node is provided with a local clock that is used to determine the arrival time of a packet from the network. Slave nodes send packets through the network to the master node. The master node sends the arrival time of the packet to the originating slave node. The slave note measures the arrival time of that packet.

The timing packets should be sent at fine grained randomized times to prevent a time granularity that is introduced by the invented clock distribution system itself.

Each slave node measures the arrival time granularity and compares it with the arrival time granularity at the master node. The offset of both values determines the frequency offset of the Slave clock. The frequency of the Slave clock can be calculated from the equation: $F_S = F_M * G_M / G_S$. With S: Slave, M: Master, G: Granularity grid in seconds, F in Hertz.

The Reference Granularity (RG) is based on the analysis of packet arrival times on packets arriving at both master and slave nodes that were send through one common time-granular switching/routing component. From these arrival times the underlying time grid is determined.

Figure 3:
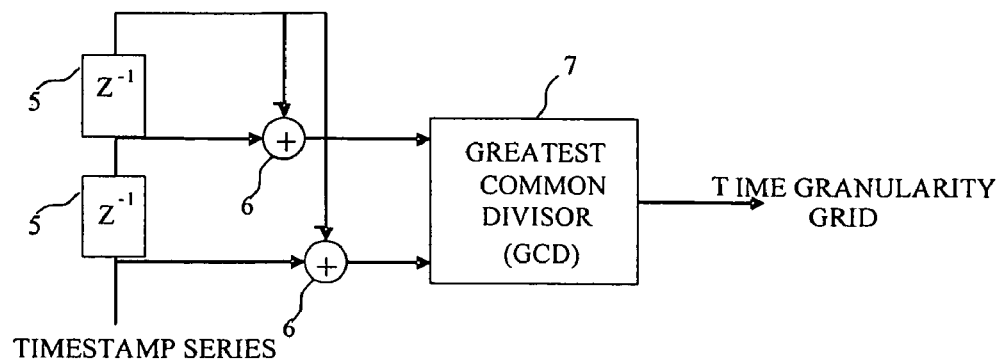
FIG. 3 is a block diagram one embodiment of apparatus, in accordance with the present invention, for measuring the time granularity grid using a series of noise-free timestamps.

The time granularity grid can be determined from noise-free timestamp samples using an initial timestamp $t_0$, a first timestamp $t_1$ and a second timestamp $t_2$ and calculate the Greatest Common Divisor (GCD) of $(t_1-t_0)$ and $(t_2-t_0)$ for example using FIG. 3. The time grid measured at master and slave will show a slight offset that is linearly related to the frequency offset between the master and slave clock. The measured time-grid offset is then used to produce a frequency-offset free clock at the slave.

The novel method is robust for noise in the measurements and determines an accurate result. Experiments have shown a precision better than 1 ppb ($10^{-9}$) using the arrival times of 10-100 packets in an interval of a few seconds.

Figure 1:
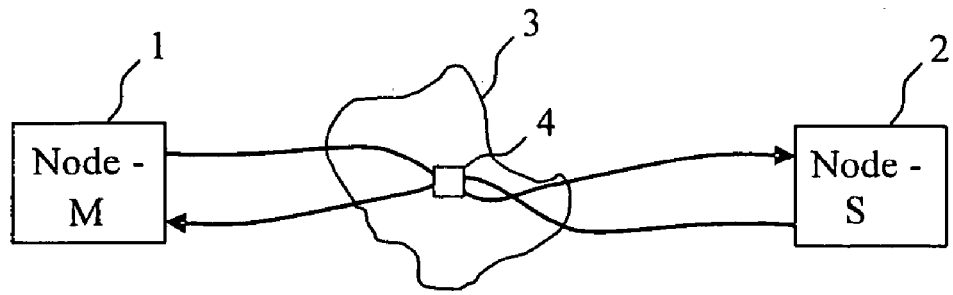
FIG. 1 shows a Master node and a Slave node connected to a communication network.

Referring now to FIG. 1, a master node 1 and a slave node 2 are each connected to a communication network 3 that includes a time granular switching/routing component 4, or a series of such components. The master node 1 and slave node 2 exchange packets over the network 3. The component 4 works on a time grid and introduces granularity into the network 3.

Figure 2:
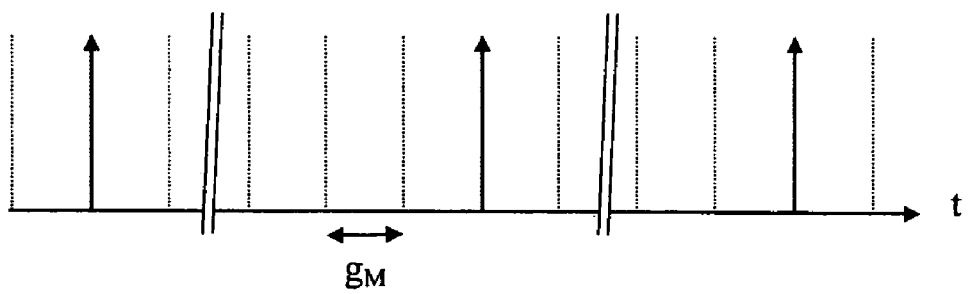
FIG. 2 is a timing diagram that shows the time granularity grid of the network.
Figure 2:
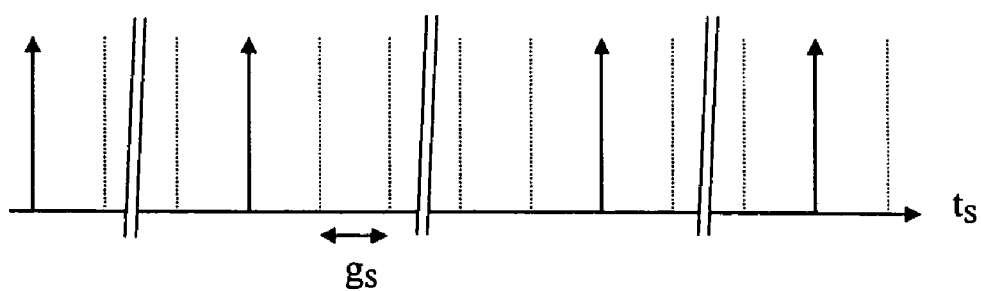

FIG. 2 is a timing diagram that shows the same time granularity grid, measured relative to the master clock ($t_M$) and to the slave clock ($t_S$). $g_M$ and $g_S$ are the granularity intervals measured relative to the master and slave clocks respectively. The arrival of packets on this grid measured relative to the respective master and slave clocks is shown by the vertical arrows.

In order to measure the time granularity grid, a series of packets is sent in both directions through the network 3 between the master and slave nodes. The packets are time stamped on arrival using the local clock associated with the node receiving the packets. The packets arrive at the receiving node at times that are distinct multiples of the underlying network time grid, which as noted has a distinct granularity. The receiving node then searches for a denominator value that provides a common remainder for the series of timestamps captured on arrival. As shown in FIG. 3 the timestamps are passed through delay lines 5 and adders 6 before being input to circuit 7, which determines the greatest common divisor (GCD) of the series of arriving packets.

Once the common denominator has been found, a frequency offset of the local slave clock creates an offset to both denominator values found at the master and the slave. The system uses the found offset to adjust the slave clock frequency or to generate a new clock from the slave clock using frequency synthesis techniques. The system can be used in combination with existing time synchronization techniques to improve the precision.

Figure 4:
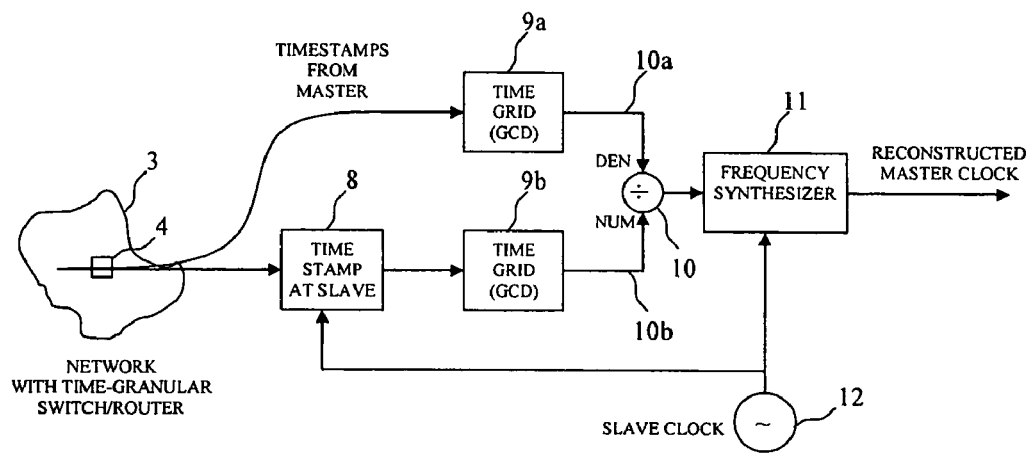
FIG. 4 is a block diagram showing apparatus, in accordance with one embodiment of the present invention, for reconstructing a Master clock using a frequency synthesizer.

FIG. 4 is a block diagram showing apparatus, in accordance with the present invention, for reconstructing a master clock using a frequency synthesizer (11) that multiplies the slave clock (12) frequency by the ratio of the number representing the slave time-grid (9b) over the number representing the master time grid (9a). This is produced by divider 10, which receives inputs 10, 10b from the respective time grid units 9a, 9b. The slave time-grid is obtained by feeding the incoming time stamps to time stamp unit 8, which stamps the incoming packets with time based on the slave clock. The frequency synthesizer 11 outputs a reconstructed master clock, which as can be seen is obtained by using a frequency synthesis technique that multiplies the Slave clock with the ratio $G_S/G_M$.

Figure 5:
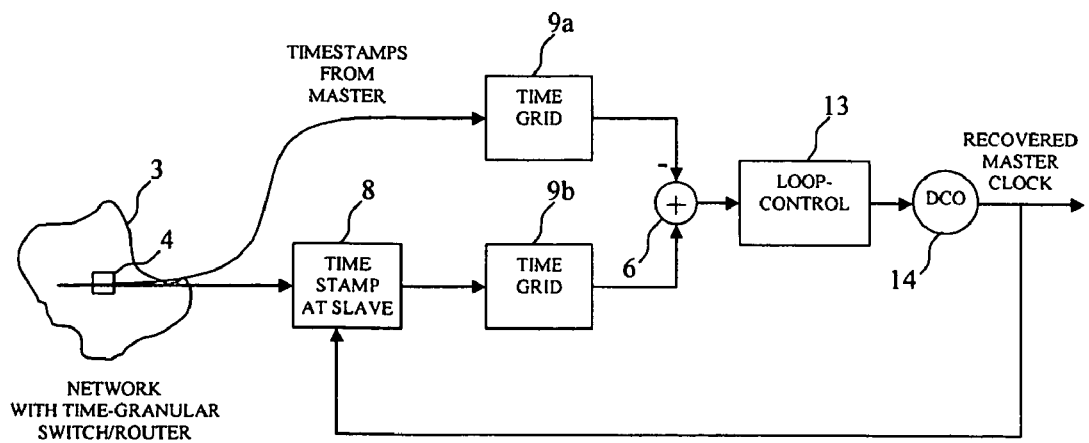
FIG. 5 is a block diagram showing apparatus, in accordance with one embodiment of the present invention, for recovering the Master clock by adjusting the Slave clock frequency.

FIG. 5 is a block diagram showing an alternative embodiment where the outputs of the time grid units 9a, 9b are subtracted in subtractor 6 to develop a difference signal, which is input to loop control unit 13. This controls a digital controlled oscillator 14 to produce the recovered master clock which provides the local clock for the slave node. The Loop controller 13 reduces the difference 6 ($G_M$–$G_S$) between the measured master time grid 9a and the measured slave time grid 9b to zero.

FIG. 4 and FIG. 5 provide two examples of a possible implementation of the described invention. The example of FIG. 5 can be mapped on hardware. The example of FIG. 4 requires a division which is more suitable for execution on a programmable processor.

FIG. 6 is a block diagram showing apparatus for determining a rough guess of the time granularity grid present in a given set of noisy series of timestamp. The incoming timestamps are passed through Muc 15, and the difference between the transit time of a current packet and a delayed packet is found in subtractor 6. The packets that fall under a threshold are removed by unit 16 and then the remaining packets are sorted in unit 17.

The time granularity grid can also be obtained in presence of jitter effects and noisy timestamp samples by an iterative process on a dataset that starts with a value-sorted series of timestamp samples ($t_n$) and operates by carrying out the following steps:

a) Update the dataset by differentiating the samples in the dataset;

b) Remove all samples below a given threshold level. If only one sample is left then this is the guess for the time granularity grid and the iterations are done.

c) Sort the given set of samples by value.

d) Add one zero sample to the set of samples and keep the set sorted.

e) Continue repeating the iteration at step-a.

The threshold level is an optimization factor and should be smaller than the minimally expected granularity level and bigger than the expected amount of measurement noise. Step -b and -c can be exchanged but is less efficient.

A precise estimate of the time granularity grid can be obtained by using an initial guess for 'G' by carrying out an iterative process on a dataset that starts with a value-sorted series of timestamp samples ($t_n$) and operates by:

a) updating the dataset by differentiating the samples in the dataset;

b) removing all samples below a given threshold level until one sample is left;

c) sorting the samples by value;

d) adding one zero sample to the set of samples while keeping the set sorted;

e) continue repeating the iteration at step-a. The value for 'G' can then be further refined by maximizing 'A' given timestamp series '$t_n$' in the complex exponential equation given by:

$$A = \left| \sum_n e^{(2 \cdot \pi \cdot i \cdot \frac{t_n}{G})} \right|$$

A fast method to refine the value of G of is to calculate two results $A_1$ and $A_2$ from the above equation for two nearby values $G_1$ and $G_2$ and provided that $G_1 < G < G_2$. The refined value for G is then obtained by the equation given by:

$$G = \frac{A_1^2 \cdot G_1 + A_2^2 \cdot G_2}{A_1^2 + A_2^2}$$

A simplified method for calculating the sum of the complex exponential term in the above is to use integer valued timestamps, a division and a lookup table that contains a sampled and scaled version of a complex unity circle of the exponential term (FIG. 7). For each timestamp a Re,Im number pair is read from a lookup table that contains 16 of these number pairs. The table is addressed with the 4-bits integer remainder from the division of the timestamp multiplied by 16 and divided by the value of G. The series of Re-numbers are added and then squared; the series of Im-numbers are added and then squared; finally both squared results are added to obtain the squared amplitude ($A^2$) of all summed Re,Im-vectors.

Alternatively any alternative look-up table that take any smaller or larger number of entries in the table or that take other resolutions of the Re, Im samples can be used.

The RG-method using the above equation loses sensitivity when the clock. frequency drift over the measurement interval causes a time deviation that is near or larger than the time granularity grid. The iterative method is less sensitive to clock drift but more sensitive to noise which then results in less precision. The more iterations required to provide result, the greater the sensitivity to noise.

FIG. 8 shows the result from real arrival time measures that were taken from packets traveling through a timing granular switching component. The arrival times were fed through a modulus operator. These figures can only be produced using a very precise estimate of the granularity grid. Even a small deviation to that estimate will lead to a thick band of measurement points spreading over the whole range of the applied modulus. The bends in the curve are a cause of the frequency drift of the system clock of the packet switching component.

It will be seen that the invention permits the recovery of a clock frequency at a destination node (slave) that is a precise copy of a clock at a source node (master) by sending packets over a packet network. A source node sends packets to destination nodes the destination nodes send packets to the source node. The packet network can be of any type, e.g. Ethernet, ATM or synchronous networks. This invention applies in a network that contains a network switching/routing component that forwards packets at distinct multiples of an underlying time grid. This invention also applies in a synchronous network where series of these switching/routing components forward data at common distinct multiples of an underlying time grid, e.g. SDH networks.

All references are incorporated herein by reference.

What is claimed is:

1. A method of recovering timing information between master and slave nodes with respective master and slave clocks interconnected over a packet network having an underlying time grid with a distinct granularity, comprising:
   exchanging a series of timing packets between said master and slave nodes or sending timing packets from a network component to said master and slave nodes;
   measuring an offset of said time grid relative to the master and slave clocks; and
   using said offset to create a clock at the slave node matching said master clock, and wherein the time grids are measured relative to said master and slave clocks by examining the series of timing packets received at said respective master and slave nodes to find a denominator value that provides a common remainder for the series of received packets.

2. A method as claimed in claim 1, wherein said offset is used to adjust the frequency of the slave clock to match the master clock.

3. A method as claimed in claim 2, wherein the difference between the time grids measured relative to the master and slave clocks is used to control the frequency of said slave clock.

4. A method as claimed in claim 1, wherein the frequency offset is used to control a frequency synthesizer generating said slave clock.

5. A method as claimed in claim 4, wherein the ratio of the ratio of the time grids measured relative to the master and slave clocks is used to control said frequency synthesizer.

6. A method as claimed in claim 1, wherein the slave node sends said series of timing packets to the master node, and the master node sends the arrival time of the packet relative to the master clock back to the originating slave node.

7. A method as claimed in claim 1, wherein the timing packets are sent at fine grained randomized times.

8. A method as claimed in claim 1, wherein the frequency of the slave clock is calculated from the equation: $F_S = F_M * G_M / G_S$, where S: Slave, M: Master, G: Granularity grid in seconds, F in Hertz.

9. A method of recovering timing information between master and slave nodes with respective master and slave clocks interconnected over a packet network having an underlying time grid with a distinct granularity G, comprising:
   exchanging a series of timing packets between said master and slave nodes or sending timing packets from a network component to said master and slave nodes;
   measuring an offset of said time grid relative to the master and slave clocks; and
   using said offset to create a clock at the slave node matching said master clock, suited for use in the presence of jitter effects and noisy timestamp samples, comprising carrying out an iterative process on a dataset that starts with a value-sorted series of timestamp samples ($t_n$) and operates by:
   a) updating the dataset by differentiating the samples in the dataset;
   b) removing all samples below a given threshold level until one sample is left;
   c) sorting the samples by value;
   d) adding one zero sample to the set of samples while keeping the set sorted;
   e) continue repeating the iteration at step-a.

10. A method as claimed in claim 9, wherein the time granularity grid for each node is obtained by using an initial guess for the time grid G further refining G by maximizing A in a given timestamp series '$t_n$' in the complex exponential equation given by:

$$A = \left| \sum_n e^{\left(2 \cdot \pi \cdot i \cdot \frac{t_n}{G}\right)} \right|$$

11. A method as claimed in claim 10, comprising finding for A two results $A_1$ and $A_2$ for two nearby values $G_1$ and $G_2$, provided that $G_1 < G < G_2$, and obtaining the refined value for G from the equation:

$$G = \frac{A_1^2 \cdot G_1 + A_2^2 \cdot G_2}{A_1^2 + A_2^2}.$$

12. A method as claimed in claim 10, wherein the sum of the complex exponential term in the equation $$A = \left| \sum_n e^{\left(2 \cdot \pi \cdot i \cdot \frac{t_n}{G}\right)} \right|$$

is calculated by using integer valued timestamps, a division and a lookup table that contains a sampled and scaled version of a complex unity circle of the exponential term.

13. An arrangement for recovering timing information between master and slave nodes with respective master and slave clocks interconnected over a packet network having an underlying time grid with a distinct granularity, comprising:
   means for measuring an offset of said time grid relative to the master and slave clocks;
   means for creating a clock at the slave node matching said master clock using said measured offset, and
   wherein said time grid measuring means comprises a greatest common divisor calculator to determine the greatest common denominator of said series of timing packets that provide a common remainder.

14. An arrangement as claimed in claim 13, wherein said slave clock comprises a digital controlled oscillator controlled by said means for measuring an offset of said time grid.

15. An arrangement as claimed in claim 14, further comprising a difference circuit for generating a difference signal controlling said digital controlled oscillator, said difference circuit receiving inputs respectively from said means for measuring an offset of said time grid relative to the master clock and said means measuring an offset of said time grid relative to the master clock.

16. An arrangement as claimed in claim 13, further comprising a frequency synthesizer for creating a reconstructed clock from said slave clock and the ratio of the time grids measured relative to the master and slave clocks.

17. An arrangement for recovering timing information between master and slave nodes with respective master and slave clocks interconnected over a packet network having an underlying time grid with a distinct granularity G, comprising:
   means for exchanging a series of timing packets between said master and slave nodes or sending timing packets from a network component to said master and slave nodes;
   means for measuring an offset of said time grid relative to the master and slave clocks; and
   means for creating a clock at the slave node matching said master clock using said measured offset, wherein said means for measuring is configured to carry out an iterative process on a dataset that starts with a value-sorted series of timestamp samples ($t_n$) and operates by:
   a) updating the dataset by differentiating the samples in the dataset;
   b) removing all samples below a given threshold level until one sample is left;

c) sorting the samples by value;
d) adding one zero sample to the set of samples while keeping the set sorted;
e) continue repeating the iteration at step-a.

18. An arrangement as claimed in claim 17, wherein the means for measuring the time grid comprises a lookup table for producing real and imaginary parts of a complex number A for each time stamp in a given series $t_n$, where $$A = \left| \sum_n e^{\left(2 \cdot \pi \cdot i \cdot \frac{t_n}{G}\right)} \right|.$$

* * * * *